Figure 1:
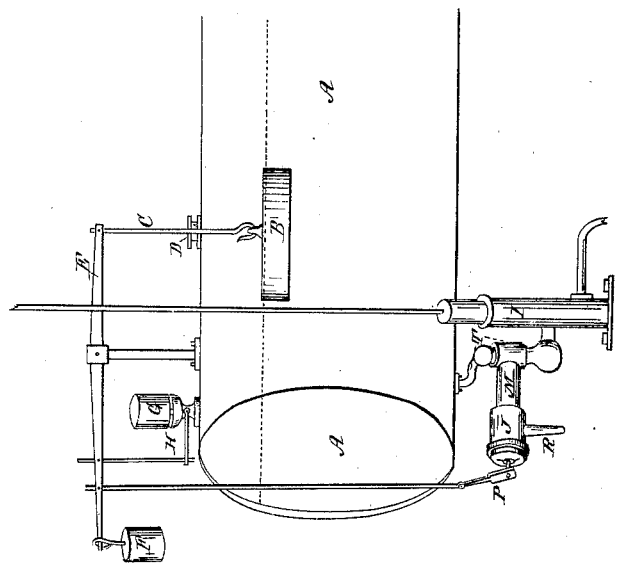
Figure 1:
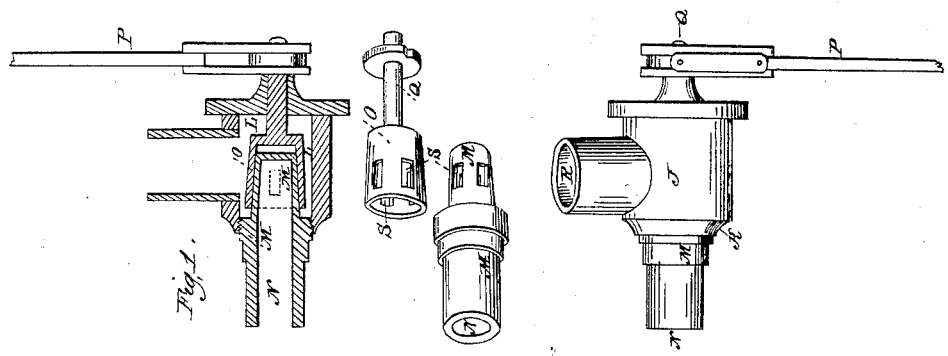

Sanderson & Stanton,
Steam-Boiler Water-Feeder,

Nº 28,307. Patented May 15, 1860

Witnesses.
Jas Shachau
R. F. Stevens.

Inventors.
W. J. Sanderson
Sidney Stanton

UNITED STATES PATENT OFFICE.

W. J. SANDERSON AND SIDNEY STANTON, OF SYRACUSE, NEW YORK.

IMPROVEMENT IN STEAM-BOILER FEEDERS.

Specification forming part of Letters Patent No. 28,307, dated May 15, 1860.

*To all whom it may concern:*

Be it known that we, W. J. SANDERSON and SIDNEY STANTON, of Syracuse, in the county of Onondaga and State of New York, have invented a new and useful Improvement in Devices for Regulating the Height of Water in Steam-Boilers; and we do hereby declare the following to be a full, clear, and exact description of the construction and operation of the same, reference being had to the annexed drawing, making part of this specification.

Our invention consists in the arrangement of a discharging-valve constructed as hereinafter stated and connected with the water-pump of the boiler, a solid float within the boiler balanced by a weight without, and a steam-whistle, all so connected as to regulate the amount of water in the boiler when the engine is operating and give notice when there is a deficiency of water when the engine is at rest.

In the drawing, A represents the steam-boiler, which may be constructed in any of the well-known forms. Within the boiler place a solid float, B, which may be made of stone or other solid material, and connected by a small rod, C, passing through a packing-box, D, to a balancing-beam, E. The rod C is connected to one end of the beam and a weight, F, to the opposite end. A steam-whistle, G, is also connected with the balancing-beam E by the connecting-rod and crank H.

The water-pump I may be connected to the machinery of the engine in any manner well known to machinists, by which the pump will continue running while the engine is in operation, and connected with the pump is a discharging-valve, J, which is also connected with and operated by the balancing-beam E. This valve J consists of the outer case, K, which forms a chamber, L, which connects with the chamber of the pump or with the discharge-pipe leading from the pump to the boiler, the nipple M, terminating the supply-pipe N, the tapering socket O, and the crank P, which is connected with the balancing-beam E. The crank P is connected to the stem Q of the conical socket O.

R is a discharging-pipe connecting with the chamber L of the valve-case J.

To construct the discharging-valve, make the socket O of brass or other suitable metal, having its inner part made tapering to correspond with the outer surface of the tapering portion or nipple M. The corresponding surfaces of the nipple and socket may be carefully ground together, and openings S may be made through the sides of both nipple and socket, so that when the two are placed together, as shown at the sectional drawing, Fig. 1, the openings S will correspond with each other.

T is the pipe which conveys the water from the pump I to the boiler A. To this pipe is connected the pipe N of the nipple M.

The float B we make of a solid block of stone, nearly balanced by the weight F. By making the float large and of heavy material any slight variation in the height of the water will readily work the rod C′ through the packing-box D, and thus operate the whistle and the discharging-valve through the cranks H and P.

It is intended that the water-pump be connected with the steam-engine, that it shall be constantly working to throw water into the boiler—that is, while the engine is in motion. By the falling of the weight or float in consequence of the deficiency of water in the boiler, socket O of the discharging-valve is made to revolve slightly on the nipple M, closing the openings S and throwing all the water of the pump through the pipe T into the boiler A, and when the water in the boiler has risen to the requisite height the float will operate to again open the openings S, when the water thrown by the pump will pass through the discharging-pipe R instead of going into the boiler.

The solid float is superior to a hollow float such as have been in common use, on account of greater weight, and by being made to occupy a considerable portion of the surface of the water very slight changes in the amount of water will cause a force of several pounds to open and close the valve and whistle.

By constructing the discharging-valve in the manner stated, the surfaces of each part being tapering, the wearing between the surfaces will not cause a leak, but will be prevented by the socket working farther upon the nipple.

We do not claim as our invention the use of a simple float in boilers to regulate the pressure of the steam or the height of the water; but What we do claim as our invention, and desire to secure by Letters Patent, is—

The arrangement of a discharging-valve constructed in the manner stated and connected with the water-pump of steam-boilers, a solid float, B, within the boiler balanced by a weight without, and the steam-whistle G, connected with the balancing-beam E, as described, when the valve J operates, as set forth, to regulate the amount of water in the boiler, and the whole is constructed, arranged, and operated in combination, substantially as described.

W. J. SANDERSON.
      SIDNEY STANTON.

Witnesses:
 R. F. STEVENS,
 I. O. FILLMORE.